US006826557B1

(12) United States Patent
Carter et al.

(10) Patent No.: US 6,826,557 B1
(45) Date of Patent: Nov. 30, 2004

(54) METHOD AND APPARATUS FOR CHARACTERIZING AND RETRIEVING QUERY RESULTS

(75) Inventors: Stephen R Carter, Spanish Fork, UT (US); Stephen Charles Bannister, Springville, UT (US)

(73) Assignee: Novell, Inc., Provo, UT (US)

( * ) Notice: Subject to any disclaimer, the term of this patent is extended or adjusted under 35 U.S.C. 154(b) by 193 days.

(21) Appl. No.: 09/887,136

(22) Filed: Jun. 22, 2001

Related U.S. Application Data

(63) Continuation-in-part of application No. 09/270,382, filed on Mar. 16, 1999, now Pat. No. 6,275,819.

(51) Int. Cl.[7] ............................................. G06F 17/30
(52) U.S. Cl. ................................. 707/2; 707/3; 707/10
(58) Field of Search .................... 707/2, 3, 10; 709/200, 709/217

(56) References Cited

U.S. PATENT DOCUMENTS

| | | | |
|---|---|---|---|
| 5,950,188 A | * | 9/1999 | Wildermuth .................... 707/3 |
| 6,185,598 B1 | * | 2/2001 | Farber et al. ................ 709/200 |
| 6,356,887 B1 | * | 3/2002 | Berenson et al. ............... 707/2 |
| 6,532,490 B1 | * | 3/2003 | Lewis et al. ................. 709/217 |
| 2002/0133504 A1 | * | 9/2002 | Vlahos et al. ........... 707/104.1 |

OTHER PUBLICATIONS

Saharia et al "Enhancing data warehouse performance though query caching", ACM SIGMIS Database, vol. 31, No. 3, Jun. 2000, pp. 43–63.*
Shim et al "Dynamic caching of query results for decision support systems", Eleventh International Conference on Scientific and Statistical Database Management, Jul. 28–30, 1999, pp. 1–10.*

* cited by examiner

Primary Examiner—Uyen Le

(57) ABSTRACT

A system and method used to characterize query results and retrieve the query results based on the characterization. An informational resource is queried and query results are received. The filter arguments, filter values, data set names and data item labels of the query are determined. The query results are stored locally, such as in cache, and registered based on the determined filter arguments, filter values, data set names and data item labels. Using the registration, all or a portion of the stored query results can be retrieved. Information and notification may be automatically sent to senders when responsive query data is modified in one or more external or local data stores. Moreover, senders may customize how long queries remain within the cache or data store, and when the responsive data associated with the queries are to be updated within the cache or the data store.

23 Claims, 6 Drawing Sheets

METHOD AND APPARATUS FOR CHARACTERIZING AND RETRIEVING QUERY RESULTS

This application is a continuation in part and claims priority from application Ser. No. 09/270,382, filed Mar. 16, 1999, issued U.S. Pat. No. 6,275,819, issued on Aug. 14, 2001, the disclosure of which is incorporated herein by reference.

TECHNICAL FIELD

The present invention relates generally to computer systems and methods, and will be specifically disclosed as a method and apparatus for characterizing and retrieving query results.

BACKGROUND OF THE INVENTION

The virtual explosion of technical advances in microelectronics, digital computers and software have changed the face of modern society. In fact, these technological advances have become so important and pervasive that this explosion is sometimes referred to as "the information revolution." Through telephone lines, cables, satellite communications and the like, information and resources are ever increasingly being accessed and shared.

A request for information is called a query. Very often, particularly with remotely networked computers (such as the Internet), the retrieval of information or data responsive to a query is slow or otherwise expensive to retrieve. For instance, the retrieval of information from a remote location is limited by the speed of the connection, which is sometimes referred to as bandwidth. In the case of the Internet, the bandwidth is typically limited by the throughput capability of a modem or the remote computer from which information is being retrieved.

Once information is retrieved, it is often desirable to store the information locally, where it can be quickly and easily accessed. One such example of local storage is volatile or nonvolatile cache memory. Local storage is a relative term depending upon the source of the information and can include many variations. For instance, information retrieved over the Internet from a distant server could be stored locally in a server within a local network. As a further example, information retrieved from a server on a local network could be stored locally on a workstation. While local storage of information has an advantage of quick and inexpensive retrieval, it is desirable for such information to be organized for subsequent retrieval. In part, the present invention provides a method and means for characterizing query results for subsequent retrieval.

SUMMARY OF THE INVENTION

Accordingly, an aspect of the invention is to provide a method and system for characterizing and retrieving data. Additional aspects, advantages and novel features of the invention will be set forth in the description that follows and, in part, will become apparent to those skilled in the art upon examining or practicing the invention. The aspects and advantages of the invention may be realized and obtained by means of the instrumentalities and combinations particularly pointed out in the appended claims.

In one aspect of the invention, a method is used to characterize query results. One or more informational resources are queried and the query results are received. The filter arguments, filter values, data set names, and data item labels corresponding to the query results are determined. The query results are registered in cache based on the filter arguments, filter values, data set names, and data item labels. Using the registration, the query results from the cache are retrieved.

Another aspect of the invention is a reference to data values stored on a computer readable medium. The data values are responsive of a query to a data set on an informational resource, the data set having a data set name. The query has one or more filter arguments, one or more filter values and one or more data items labels. The reference includes a first identifier corresponding to the data set name of a data set on the informational resource. A second identifier corresponds to the filter arguments of the query. A third identifier corresponds to the filter values of the query. A fourth identifier corresponds to the data item labels of the query.

Yet another aspect of the present invention is a method for retrieving data values using a reference. The reference corresponds to data values stored on the computer readable medium. A query is received which includes one or more data set names, one or more filter arguments, one or more filter values, and one or more data item labels. It is determined whether the data set names in the query correspond to a first identifier in the reference, whether the filter arguments in the query correspond to a second identifier in the reference, whether the filter values of the query correspond to a third identifier in the reference, and whether the data item labels of the query correspond to a fourth identifier in the reference. If all of the determinations are affirmative, then at least a portion of the data values are retrieved from the computer readable medium.

Moreover, methods of returning and managing query results are provided, wherein a query is received, parsed into its arguments, and normalized. A cache is then searched for the query and results data responsive to the query, if the query and results data are present in the cache, they are returned. Further, if partial results data exists in the cache then the missing results data are obtained and associated with the query in the cache and a complete response is returned including an assembled results data responsive to the original query.

Furthermore, a system for retrieving queries is provided comprising one or more data stores housing responsive query data to a query, a query registration set of executable instructions operable to receive a normalized query and record the query along with the responsive query data in a managing data store, and a notification set of executable instructions operable to send a notification to the managing data store if at least a portion of the responsive query data is modified when associated with the query.

Additionally, functional data is provided operable to optimize a response to a query and to index queries and query results, the functional data comprising query data and query results data responsive to the query. Further, sender data and period data may be associated with the query data. Normalization instruction data and managing instruction data are operable to parse and normalize the query and results data, searching for query data in a cache or query data store and operable to obtain and assemble results data as needed to satisfy the query data from the cache, the query data store, or one or more external data stores. Moreover, response instruction data is operable to return the query results data associated with the query data.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Figure 1:
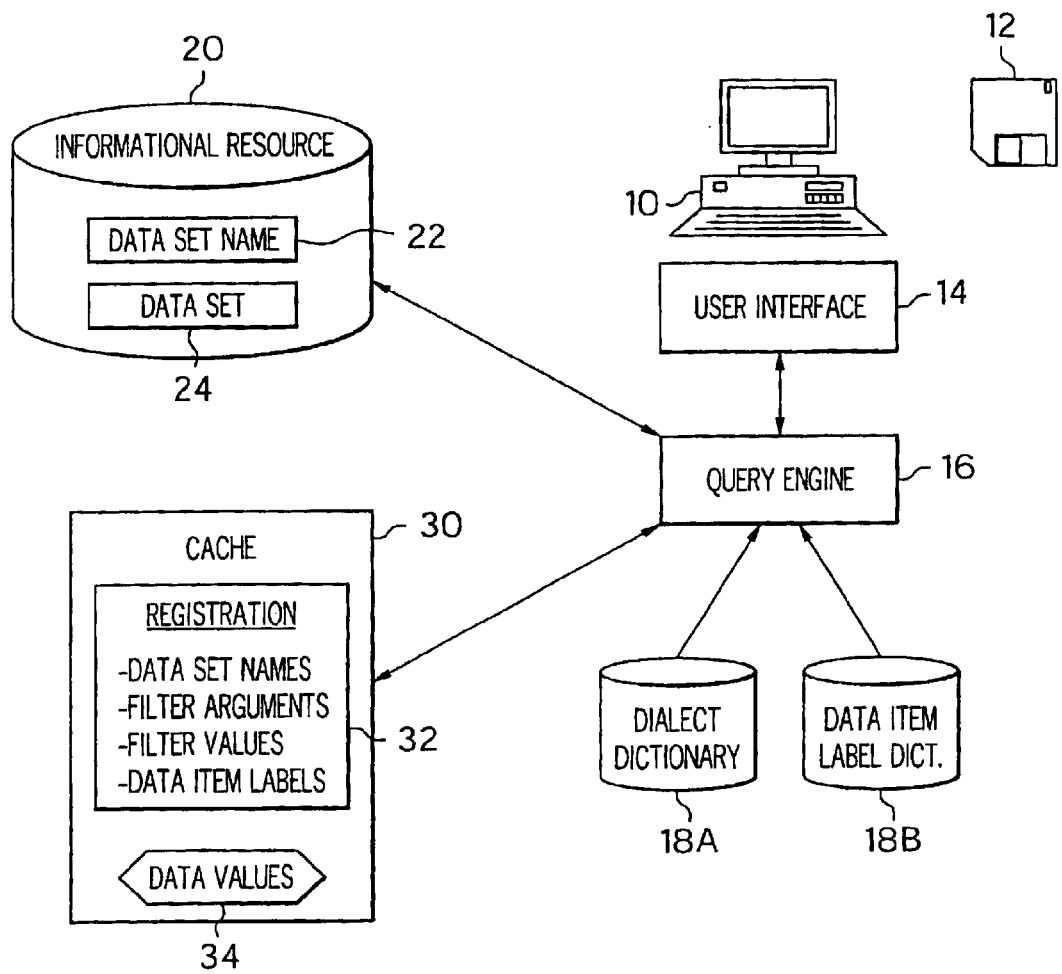
FIG. 1 illustrates a computer system.

FIG. 1 illustrates a computer system. The system includes a computer 10, such as a personal computer, a server, or any other appropriate device capable of being programmed. Programs and data for the computer 10 are generally stored on a computer readable medium 12. The computer readable medium 12, shown here as a floppy diskette, holds information readable by a computer, such as programs, data, files, etc. As one with ordinary skill in the art will readily appreciate, computer readable media can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Certain types of computer readable media, which are sometimes described as being nonvolatile, can retain data in the absence of power so that the information is available when power is restored.

An optional user interface 14 comprises a series of instructions for the computer 10. The user interface 14 acts an intermediary or interface between a human user of the computer 10 and other programs. As shown in this example, the user interface 14 is designed to interface with the query engine 16. The query engine 16 is a program comprising a series of instructions, preferably stored on a computer readable medium. The query engine 16 can comprise a one or more program modules, files or libraries, any one of which can be located locally on the computer 10 and/or remotely on other computers (such as on a local area network "LAN", on a wide area network "WAN", on the Internet, or any other remote communications system). For the purposes of illustration, the various program modules, files or libraries of the query engine 16 are shown as a single functional program block.

The query engine 16 is operative to receive and process a variety of different types of queries or other requests for information. In one preferred embodiment, the query engine processes a set query language "SQL", however, the present invention lends itself to any other query formats. SQL provides a format or set of rules through which information in databases can be requested. The user interface 14 is operative for preparing, formatting and editing SQL queries, as well as viewing, manipulating and using query results. One with ordinary skill in the art will recognize that SQL and databases are merely a preferred embodiment, and that other forms of queries and informational resources are also applicable to the present invention.

The query engine 16 is also operative for accessing and receiving data from a variety of sources. As shown in this example, the query engine 16 is capable of receiving data from an optional dialect dictionary 18A and an optional data item label dictionary 18B. Preferably, both dictionaries 18A, 18B are relational databases stored on one or more nonvolatile computer readable media. The dialect dictionary 18A includes information for normalizing queries. For instance, various versions of SQL may have different SQL dialects. An ORACLE SQL may have one dialect of SQL which uses a different syntax than a MICROSOFT SQL. In one embodiment, the dialect dictionary 18A contains information to normalize the various SQL dialects into a base dialect which the query engine 16 can understand and process.

The data item label dictionary 18B contains information for normalizing data item labels from a variety of different informational resources into a common schema. In the case of informational resources having relational database, the data item label dictionary 18B contains information to translate a variety of different fields that refer to the same information into a common field name. For instance, a variety of different database resources may label the field for social security number as SSN, S/N, Social, or the like. The data item label dictionary 18B provides information to translate these various fields to determine that they all refer to social security number, and map those fields to a common field or label (e.g. SSN) that the query engine 16 would use.

Preferably, both the dialect dictionary 18A and the data item label dictionary 18B are dynamic and can be modified. The query engine 16 can be programmed to automatically update the dictionaries 18A, B, such as if new information resources are encountered or if the base dialect or schema are modified. Further, the user interface 14 can be programmed to allow a user to manually manipulate the dictionaries 18A, B.

The query engine 16 is additionally operative to communicate with one or more informational resources. As discussed above, an informational resource can take a variety of forms, including relational databases, hierarchal databases, directories, hypertext markup language "HTML" documents, web pages, files, textual documents, blobs, sets of formatted transactions, and the like. For the purposes of illustration, assume that the informational resource 20 is a relational database stored in a distant location, such as on the Internet. The informational resource 20 includes one or more data sets 24, each of which typically includes some kind of data set name 22. The data set name 22 can be textual, numeric, an address or pointer, or any other appropriate means for identifying the corresponding data set 24. If the data set name 22 for a given data set 24 cannot be determined from the informational resource 20, the query engine 16 assigns an appropriate data set name 22.

The query engine 16 is also operative to send one or more queries to the informational resource 20. Appropriate type of query will depend upon the type of informational resource 20 being queried. Generally, the query identifies the data set name 22 and preferably includes one or more filter arguments, one or more filter values, and one or more data items. The filter arguments, filter values, and data items are used to narrow the data set 24 to a portion of information that is desired, however, the entire data set could also be responsive to a query. In the case of an SQL query to a relational database, a filter argument identifies a field that is being restricted, and the corresponding filter value is the value that the field is being restricted against. The data item labels refer to the fields of data which are being extracted or returned from the relational database. By way of illustration, consider the following example of a SQL query: Select Customer Master with Last Name="Carter" SSN, Last Name, First Name. "Customer Master" is the data set name 22, "Last Name" is the filter argument, "Carter" is the filter value, and "SSN, Last Name, First Name" are the data item labels.

The query engine is further operative to receive data values 34 responsive to the queries from the data set 24. The query engine 16 stores the responsive data values 34 locally, such as in cache 30. The query engine also creates a registration 32 in cache which corresponds to the data values 34. The registration 32 provides a reference so that the data values 34, or a portion thereof, may subsequently be retrieved from cache 30. Preferably, the registration 32 comprises a series of identifiers. As shown in this example, the registration 32 includes a first identifier corresponding to the data set name 22, a second identifier corresponding to the filter arguments of the query, a third identifier corresponding to the filter values of the query, and a fourth identifier corresponding to any data item labels of the query. The identifiers are preferably determined from the query, however, the query engine 16 can also determine the appropriate identifiers from the content of the data values 34, such as through linguistic morphology or other content interpreting means. By referencing the registration 32, the query engine 16 can locally retrieve all or a portion of the data values 34 from the cache 30.

Occasionally, the data values 34 may become stale or otherwise inaccurately reflect the information in the data set 24, at which point the data values 34 and registration 32 could be purged. Alternatively, an updating query could be generated based on the registration 32, the updating query submitted to the informational resource 20, and the query results substituted for the data values 34. Preferably, an updating query would be submitted during a period of low usage so as not to unduly tax the bandwidth between the query engine 16 and the informational resource 20.

Figure 2:
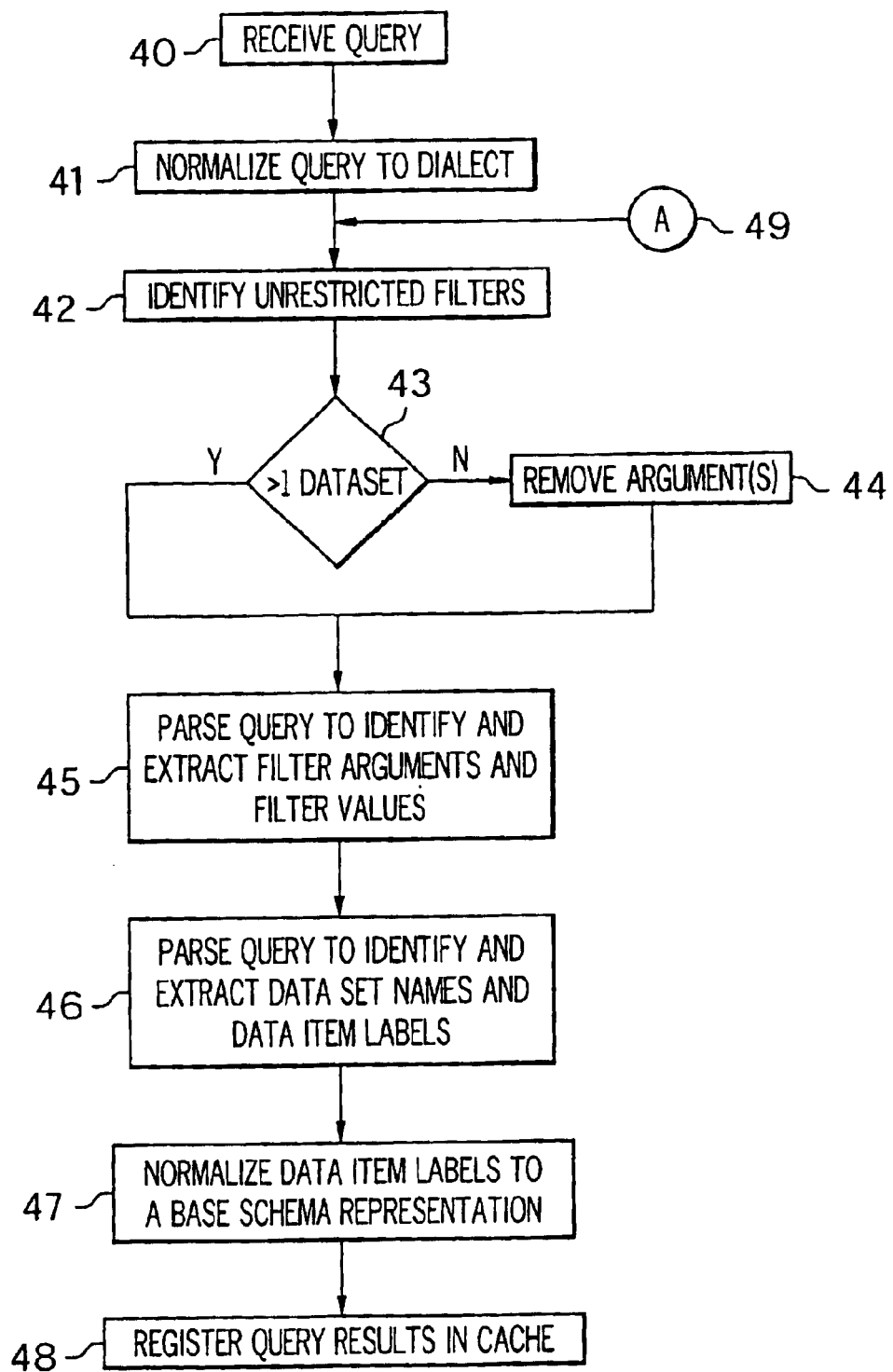
FIG. 2 illustrates a flowchart of a method for characterizing a query result.

FIG. 2 depicts an embodiment of a method for characterizing a query result. Preferably, the method is embodied as a series of instructions stored on a computer readable medium. In step 40, a query is received. Optionally, the query is normalized to a base dialect in step 41, preferably using a dictionary such as the dialect dictionary 18A. One with ordinary skill in the art will readily recognize that the query normalization step can be achieved with any one of a variety of techniques currently being practiced in the art. At step 42, any unrestricted filters in the query are identified. An example of an unrestricted filter is a wild card entered as a filter value (e.g. Last Name=*) At step 43, if only one data set is identified in the query, then the method proceeds to step 44 where any unrestricted filters are removed. The entire argument is removed because it is not helpful in characterizing the returned data values, since for example, the returned data values will include everything that has a Last Name.

Continuing to step 45, the query is parsed to identify and extract the filter arguments and filter values. If any filter argument or filter values were removed in step 44, then nothing will be extracted. At step 46, the query is parsed to identify and extract the data set names and data item labels. In step 47, the data item labels are then normalized to a base schema representation, preferably using a dictionary such as the data item label dictionary 18B. Using the extracted filter arguments, filter values, data set names and data item labels, at step 48 the returned data values 34 are cached and the registration 32 is entered accordingly.

Consider the following example for normalizing data items labels. Data item labels are known by different names as per the context of the user. Views are designed to communicate with the user in the context of use. Where one department may use "Last Name", another may use "Sur Name". Both usages are correct, however, to provide consistency the database administrator can design the base schema to have a single definition for "Last Name"/"Sur Name" and may perhaps name it LN48. Even this data name is in the context of the database administrator and may mean, for example, Last Name PIC 48X. The normalization of the "Last Name" and "Sur Name" would be performed by replacing both data item labels by the base schema label LN48. Also note that legacy databases may have other LN fields. The database in question may have been created from several, older still, legacy databases and one of the databases may have had a LN40 that can be accommodated.

Data item labels may also be calculated or constructed (e.g., virtual fields). In this case there is usually, but not always, a base schema data item label to map to, however, the data item label does not really exist. It may be the concatenation of several data item labels, the creation of a number by performing arithmetic on other data item labels, a lookup from another data set, etc. It is still advantageous to use the base schema data item label name to provide a ready mapping from different views.

Figure 3:
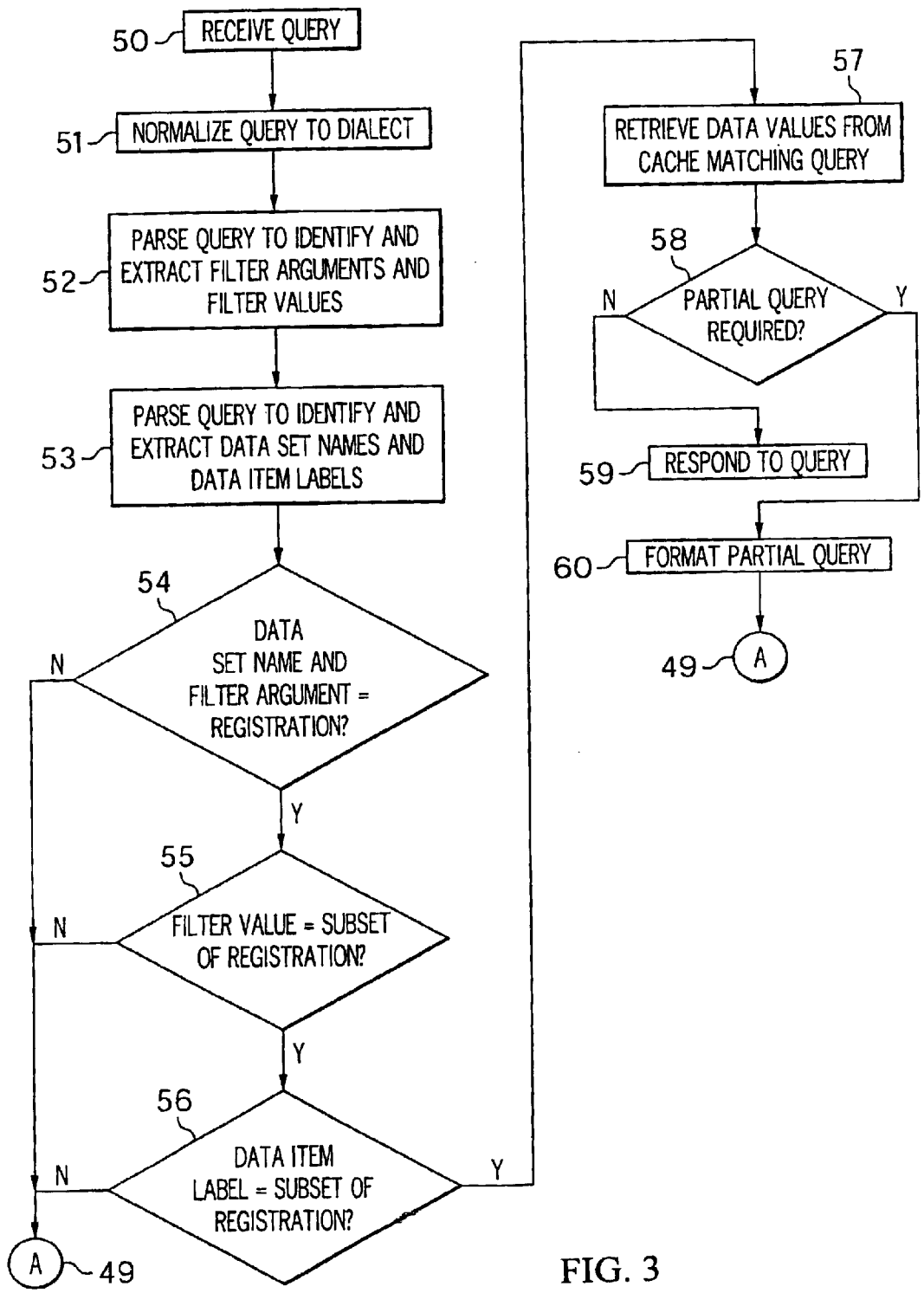
FIG. 3 illustrates a flowchart of a method for retrieving query results.

FIG. 3 illustrates an embodiment of a method for retrieving query results after they have been stored locally. At step 50, a new query is received, and at step 51 the query is normalized to a dialect. At step 52, the query is parsed to identify and extract the filter arguments and filter values. At step 53, the query is parsed to identify and extract the data set names and data item labels. Optionally, the data item labels can be normalized to a base schema representation.

The next three decision blocks are used to determine whether the previously cached data values 34 satisfy the new query, in whole or in part. At decision block 54, the data set name and filter arguments from the new query are compared to the registration 32 in cache 30 to determine if they match. If the data set name and filter arguments from the new query matches the first and second identifiers in the registration 32, respectively, then we know that the new query might be a satisfied at least in part by the data values 34 in cache 30. If decision block 54 is satisfied, then the method proceeds to step 55 where the extracted filter value from the new query is compared to the registration 32. If the extracted filter value is a subset of the third identifier, then we know that the new query might be satisfied at least in part by the data values 34 in cache 30. For instance, if the second and third identifiers in the registration 32 correspond to Name= "Car*", and the new query filter argument was Name= "Carter", we know that the new query is a subset of the second and third identifiers. In the event that the filter value from which the registration was generated was an unrestricted filter, then decision block 55 should be satisfied. in cache 30 to determine if they match. If the data set name and filter arguments from the new query matches the first and second identifiers in the registration 32, respectively, then we know that the new query might be a satisfied at least in part by the data values 34 in cache 30. If decision block 54 is satisfied, then the method proceeds to step 55 where the extracted filter value from the new query is compared to the registration 32. If the extracted filter value is a subset of the third identifier, then we know that the new query might be satisfied at least in part by the data values 34 in cache 30. For instance, if the second and third identifiers in the registration 32 correspond to Name="Car*", and the new query filter argument was Name="Carter", we know that the new query is a subset of the second and third identifiers. In the event that the filter value from which the registration was generated was an unrestricted filter, then decision block 55 should be satisfied.

If decision block 55 is satisfied, then the method proceeds to decision block 56, where the data item labels extracted from the new query are compared to the registration 32. If the extracted data item labels are a subset of the fourth identifier of the registration 32, then we know that the new query might be a satisfied at least in part by the data values 34 in cache 30. If decision block 56 is satisfied, then the method proceeds to step 57 where the portion (if not all) of the data values 34 satisfying the new query are extracted from cache 30. If any of decision blocks 54, 55, or 56 are not satisfied, then the method proceeds to step 49 where the informational resource 20 is queried, and the method continues into the method of FIG. 2.

At decision block 58, the method determines whether a partial query is required from the informational resource 20. For instance, if the cached data values 34 satisfy a portion of the new query, then a partial query is desirable since the cached data values 34 cannot provide all the requested information. If a partial query is not required, the method proceed to step 59, where the new query is responded to using the portion of data values 34 retrieved in step 57. For instance, the retrieved data values could be passed to the user interface 14 in an appropriate format.

Consider the following example. Assume that the cached data values 34 are responsive to the query Select PersonMaster with LastNam="Car*" LastName FirstName BirthDate Gender Salary HireDate. The data values 34 would contain completely the response for a new query of Select PersonMaster with LastName="Car*" LastName FirstName BirthDate Gender. In this case the cached, existing sub-relation may be queried for the entire response to the query. The retrieved data would not include data values corresponding to the data item labels Salary and HireDate, since that information was not requested in the new query. The resulting sub-relation need not be registered or cached because the data is already available in the cache.

If, however, a partial query is desired, the method proceeds to step 60 where a partial query is formatted. Preferably, the partial query is formatted to ask only for data values not retrieved during step 57. Consider the following example of a new query: Select Customer Master with Last Name="Carter" SSN, Last Name, First Name, Telephone. If the retrieved data values in step 57 satisfied everything except the "Telephone" data item label (i.e. all the information for the new query was found in the data values 34, except for the "Telephone" data item label), then the partial query could be formatted as follows to retrieve only the missing information: Select Customer Master with Last Name="Carter" Telephone. At step 49, the informational resource 20 is queried using the formatted partial query, and the method continues into the method of FIG. 2.

Figure 4:
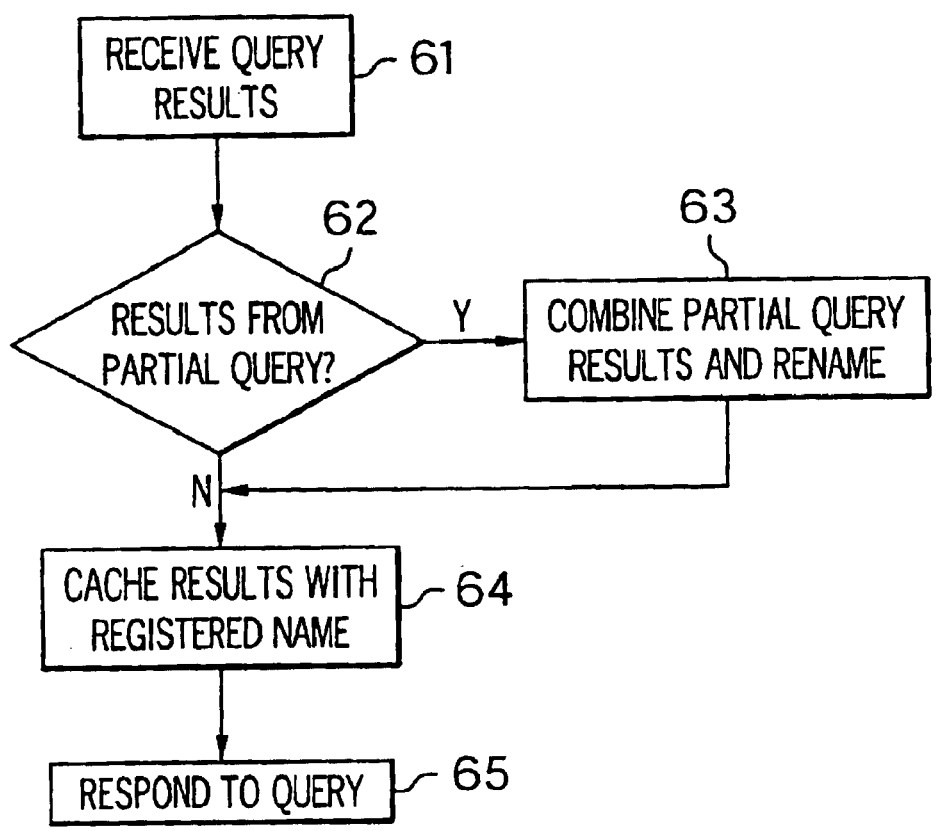
FIG. 4 illustrates a flowchart of a method for processing query results.

FIG. 4 depicts an embodiment of a method of how query results received from the informational resource 20 are processed. At step 61, query results are received. If decision block 62 determines that the results are from a partial query, the method proceeds to step 63. At step 63, the partial query results are combined with the retrieved data values 34 that satisfy the remainder of the query, and the combined query results are renamed. At step 64, the query results are cached with a registered name. At step 65 the query results are provided for use, such as through the user interface 14.

Consider the following example. Assume cached data values are responsive to the following query: Select PersonMaster with LastName="Car*" LastName First Name BirthDate. A subsequent query may be a proper subset excepting some columns, such as: Select PersonMaster with LastName="Car*" LastName First Name BirthDate Gender. In this case we can send the partial query: Select PersonMaster with LastName ="Car*" Gender. The results of the partial query can then be joined with the existing cached sub-relation with the new sub-relation and register the new sub-relation: Select PersonMaster with LastName="Car*" LastName FirstName BirthDate Gender. A different subsequent query may be a proper subset excepting some columns, such as: Select PersonMaster with LastName="Carter" LastName FirstName BirthDate Gender.

In this case we can send the partial query: Select PersonMaster with LastName="Carter" Gender. Data values are extracted from cache matching: Select PersonMaster with LastName="Carter" LastName FirstName BirthDate. The two results are then combined to end up with: Select PersonMaster with LastName="Carter" LastName FirstName BirthDate Gender. This can then be cached and registered under its own name.

Figure 5:
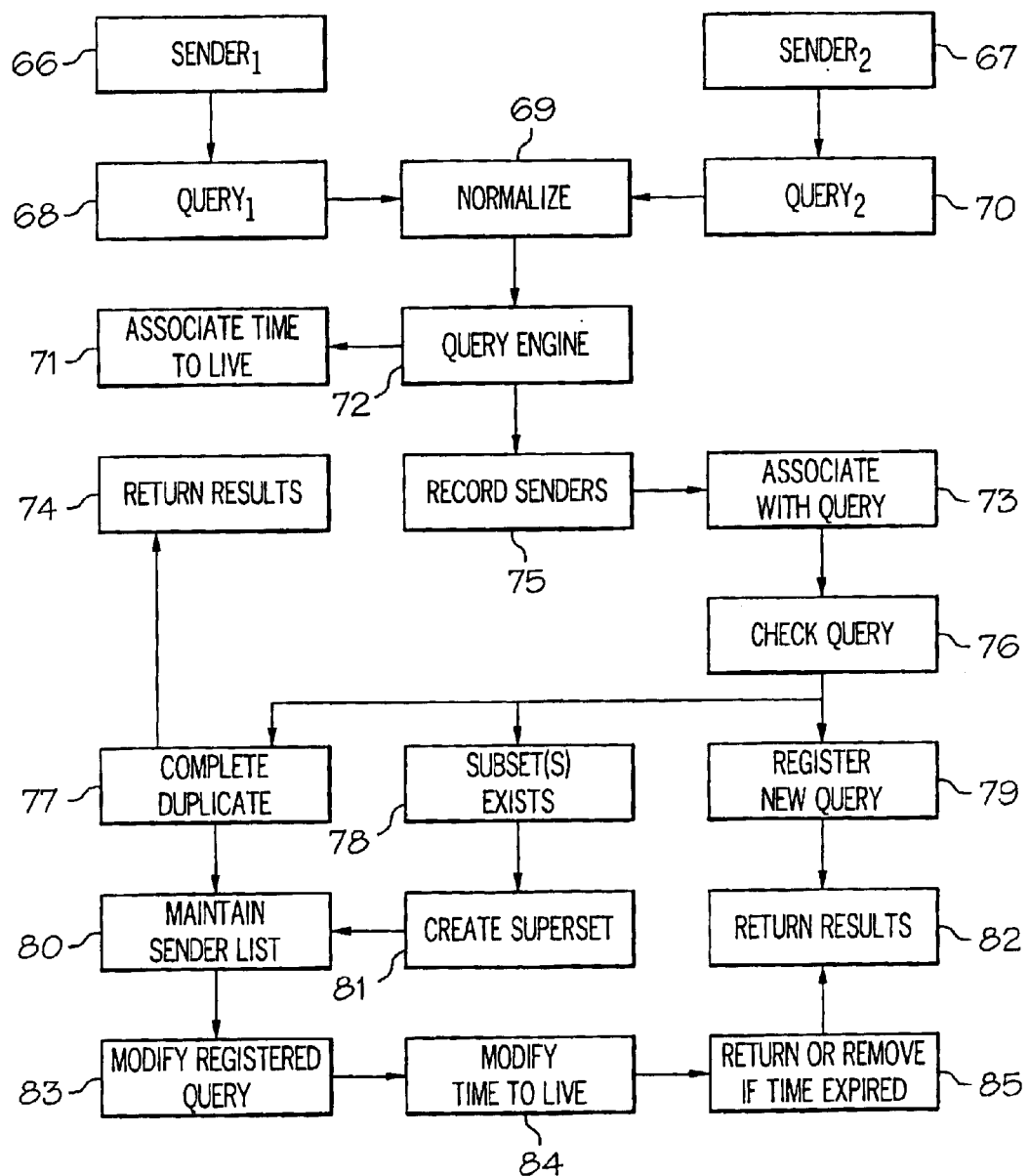
FIG. 5 illustrates a flowchart of a method of returning and managing query results.

FIG. 5 depicts a flowchart of one method for returning and managing query results. Initially a cache or any data store, being used to temporarily maintain normalized queries and query results data, is empty or partially populated with normalized queries and query results data.

As previously presented, and by way of example only, the queries themselves are further decomposed by standard parsing techniques well known to those skilled in the art into subcomponents including arguments, labels, dataset names, values, and the like. In this way the subcomponents of a single query may be associated with the single query within the cache or data store (e.g., managing data store, query data store, and the like) and yet the components may be individually recognizable and retrievable within the cache or data store.

It would be obvious to one skilled in the art that by allowing subcomponents of an individual query to be individually recognizable and retrievable within the cache or the data store, that any new incoming queries may be partially fulfilled from existing query results data associated with any existing previous subcomponents of previous queries which are registered and present within the cache or data store. This provides tremendous efficiency and optimizing benefits to the query engine and overall search and retrieval process.

Again referring to FIG. 5, a first sender in step 66 submits a first query in step 68 which is initially parsed and normalized in step 69. A sender need not be a typical end user, rather, a sender may include another software application, computing device, and others. Concurrently or at any other point in time one or more additional senders, such as a second sender in step 67 may submit a second query in step 70, which is again parsed and normalized in step 69.

Furthermore, the location of the executable instructions, for parsing the queries and normalizing the queries, is of no import since as one skilled in the art will readily appreciate, these standard operations may be performed on a centralized computing device (e.g., server-side scripting, and the like) or on a client's computing device (e.g., client-side scripting, and the like).

In step 72, a query engine set of executable instructions (step 72), which may also be centralized as a single set of instructions or as a set of distributed executable instructions, receives the queries and associates (step 73) with each query various meta data, such as and by way of example only, the address associated with the sender of the query (step 75), a queries time to live (step 71), query receipt time, query security access level, any audit tracking data, and the like.

A query's time to live may include a variable indicating when a query is to be purged or expired from the cache or the data store. This variable may be a relative time associated with the elapsed time from when the query was first sent by a sender, or it may be an absolute time such as a particular calendar date, day of a week, month, year, and the like. Alternatively, the query's time to live may be a logical expression such that when an event occurs or various other conditions occur the expression evaluates to true and the query and its associated query results data are purged from the cache or data store (e.g. step 85). Periodically, the query set of executable instructions may perform maintenance operations on the cache or the data store wherein each query is checked against its time to live and purged if required (step 85).

Next, the submitted query is searched within the cache or data store in step 76, to determine whether the query is in fact a duplicate query (step 77), whether the query is a subset of another existing query within the cache or data store (step 78), or whether the query is a new query which needs to be recorded or registered within the cache or data store (step 79).

In the situation where the query is a complete duplicate of an already existing query within the cache or data store (step 77), the meta data associated with the query contained within the cache or data store is updated to include, by way of example only the sender of the duplicate query. A single query may include a list of senders and other meta data described above within the cache or data store (e.g., sender's list in step 80).

In this way, since the meta data associated with a registered query is altered, or may be altered assuming the sender of the duplicative query is in fact a different sender not previously associated with the query stored in the cache or the data store, and the registered query is modified accordingly in step 83. Modification to the registered query may also include updating a queries time to live (step 84). It may also be that each sender has a time to live variable associated with a registered query, such that when a particular sender's time to live variable (or expression) evaluates to true, the sender associated with the registered query is removed from the maintained sender's list, but the registered query remains, assuming additional senders with time to live variables are associated with the same query and their variables/expressions evaluate to false.

Moreover, if a duplicative query is detected within the cache or data store, then the results data which is responsive to that query is immediately located and returned or otherwise made available indirectly (e.g., hypertext links, websites, faxes, and the like) to the sender in step 74.

If a decomposed query is determined to be a subset of existing queries or query components in step 78, then a single superset query may be constructed such that a single query within the cache or data store includes the subset queries or query components (step 81). If some of the results data necessary to satisfy the superset query is not present within the cache or data store, it may be obtained through standard search and retrieval techniques from one or more external or local data stores, then parsed, normalized, and properly associated with the newly formed superset query and query components within the cache or data store.

Again, meta data associated with the query that necessitated the construction of a superset query may be updated as needed (e.g. steps 80, 83, and 84). And, if a queries time to live variable or expression evaluates to true then the query may be purged in step 85, or if the variable or expression evaluates to false the results data responsive to the original query is returned normally, directly or indirectly in step 82.

If a received query is an entirely new query step, then the results data responsive to the query request is retrieved from one or more external or local data stores, parsed, normalized, properly associated with the new query and registered within the cache or data store in step 79 with the results data returned to the sender, directly or indirectly, in step 82.

Figure 6:
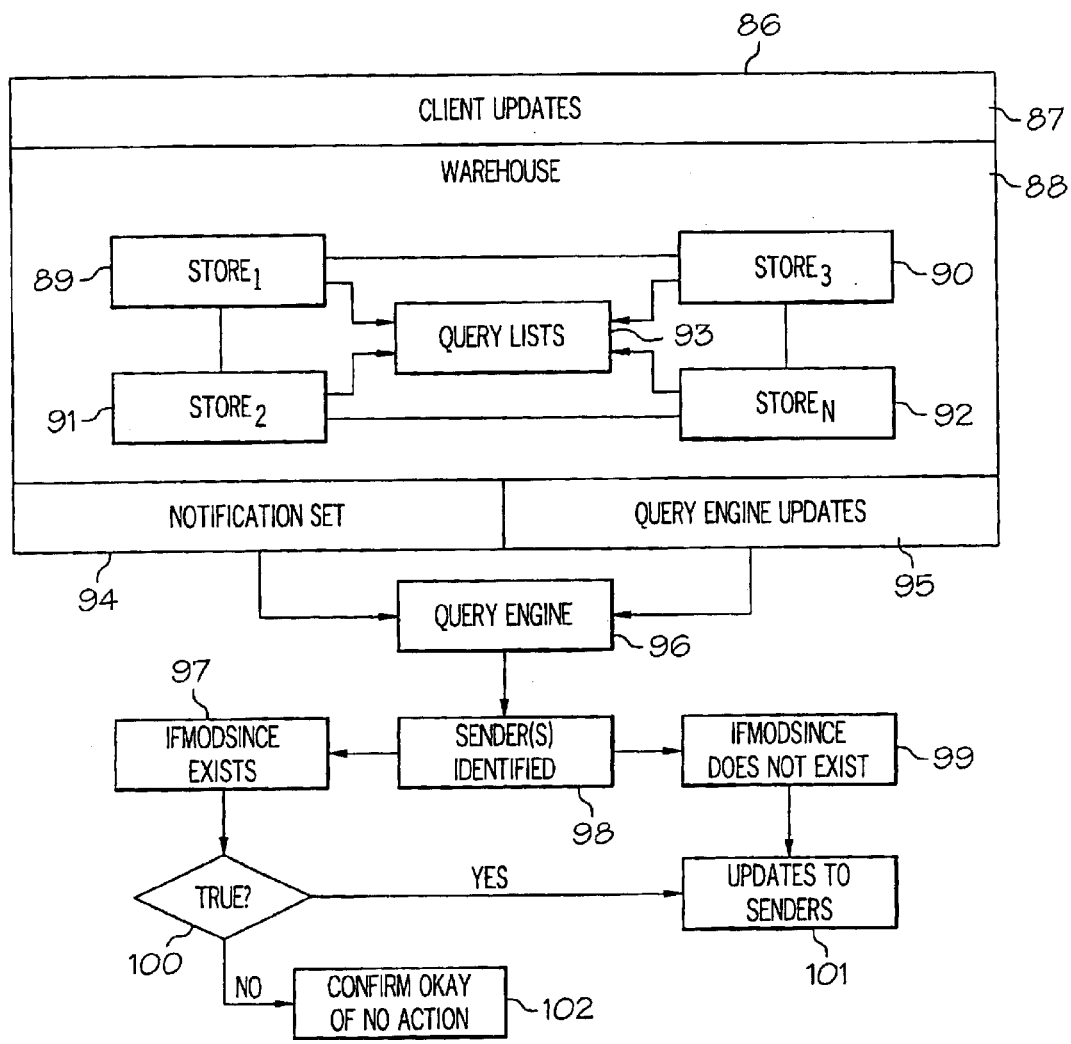
FIG. 6 illustrates a schematic diagram of a system and flowchart for retrieving and managing queries and query results.

FIG. 6 depicts a schematic diagram of one system for retrieving and managing queries and query results. System 86 includes one or more data stores (e.g., store$_1$ 89, store$_2$ 91, store$_3$ 90, and store$_n$ 92), a query registration set of executable instructions operable to receive a normalized query and record the query along with the responsive query data within a managing data store, and a notification set of executable instructions operable to send a notification to the managing data store if a portion of the responsive query data is modified.

In FIG. 6, the query registration set of executable instructions may include a Query Engine 96 which receives normalized queries and Query Engine Updates 95, the updates include responsive query data which satisfies a query. The responsive query data may reside in a data warehouse 88 which may include, by way of example only one to many data stores (89–92). Furthermore, the warehouse 88 may directly or indirectly maintain a list of queries 93 which are registered with the managing data store (not shown). The managing data store may be a cache, any volatile or involatile storage location, or any other separate data store managed and interfaced to the query engine.

Moreover, the query lists may not actually include registered queries associated with the managing data store, but may include data which is known to be responsive to registered queries within the managing data store. For example, if a query requests the home addresses of anyone with a delinquent payment on an invoice, the query list may only include links to the fields of the responsive query's home addresses within the data stores (e.g., 89–92) of the warehouse 88. In this way, should those particular home address fields change, a triggering or notification set 94 of executable or instruction data 94 may notify the Query Engine 96. Further, as one skilled in the art will readily appreciate a list data structure is not required, rather a hash table, a binary tree, or any other data structure may be used without departing from the present invention.

Once responsive query data has been identified as having been modified within the warehouse 88 and a notification or trigger is sent to the Query Engine 96, a managing set of executable instructions associates one or more senders with the query or queries which were affected by the responsive query data having been modified 98. The managing set of executable instructions may also obtain the updated responsive query data via the Query Engine Updates 95, resulting in registered queries and responsive query data included within the managing data store to be appropriately updated.

Furthermore, a sending set of executable instructions 101 may be operable to send a response or update a previous sent query from a sender via a response when responsive query data is modified. Optionally, senders may include additional meta data to associate with their queries such as a IFMODSINCE 97 variable/expression wherein the Query Engine 96 and the managing set of executable instructions do not automatically update responsive query data associated with a registered query unless requested to do so by the sender. In this way a sender, may force the updates by submitting a IFMODSINCE 97 variable or expression for the sender's query which evaluates to true 100.

In this way, the sender can customize when the managing data store is updated and when the sender receives results. By way of example only, consider a sender who may submit an initial query Q1, and then at some later point in time submits a request to the Query Engine 96 with an IFMODSINCE 97 expression of "Q1>30," indicating that if the responsive query data to Q1 has been modified within the last 30 days then it should now be updated within the managing data store and sent to the sender 101. Alternatively, if the submitted expression evaluates to false 1 00 then no action may be taken or the sender may be sent confirmation that the query based on the IFMODSINCE 97 expression is current 102. Additionally, as previously discussed no IFMODSINCE option need be present at all 99.

Also a purging executable instructions and duplication detection set of executable instructions may be deployed to remove queries and their respective responsive query data after customizable periods of time or logical evaluations, as previously presented above. Finally, as will be apparent to those skilled in the art updates to the warehouse 88 may occur from any number of client updates 87. Clients may be additional software applications, computing devices, or end users interfacing with the warehouse 88 directly to modify data contained within one of the data stores (89–92) of the warehouse 88.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

What is claimed:

1. A method of returning query results, comprising:
receiving a query and parsing the query into arguments, labels, dataset names and values;
normalizing the query arguments, the labels, the dataset names, and to be values, wherein the normalizing operation comprises translating into a common schema data from a variety of different fields from different informational resources that refer to the same information;
querying a cache to determine if the normalized query is in the cache;
returning one or more results data associated with the normalized query if present in the cache; and
registering the normalized query in the cache if not already present in the cache and obtaining the results data responsive to the normalized query to store in the cache and associated with the normalized query, wherein the registering operation includes generating identifiers for the normalized query and the results data.

2. The method of claim 1, further comprising:
returning the results data responsive to the normalized query if not present in the cache.

3. The method of claim 1, further comprising:
determining if at least a portion of the normalized query exists in the cache and returning the results data corresponding to the portion of the normalized query determined to be present in the cache.

4. The method of claim 3, further comprising:
obtaining partial results data for a portion of the normalized query which is not present in the cache, registering and returning the partial results data, and combining the partial results data with the results data to complete a response to the query.

5. Functional data for optimizing a response to a query, the functional data comprising:
query data including one or more arguments, one or more labels, one or more dataset names, and one or more values;
query results data responsive to the query data;
normalization instruction data operable to parse and normalize the query data and the results data such that different fields from different informational resources that refer to the same information can be processed by the same query data;
validation instruction data operable to search a cache for at least a portion of the query data and obtain from the informational resources missing results data for any portion of the query data not present in the cache so as to form the query results data from the missing results data and from data in the cache, wherein the validation instruction data is further operable to use the normalization instruction data to store in the cache the missing query data; and
response instruction data operable to return the query results data associated with the query data.

6. The functional data of claim 5, wherein the validation instruction data is operable to maintain a list of registered portions of the query data included in the cache.

7. A method of managing a query maintained in a cache, comprising:
receiving a query associated with a sender;
normalizing the query;
searching a cache for one or more arguments associated with the query;
obtaining results data from the cache for arguments associated with the query and present in the cache;
obtaining missing results data for one or more missing arguments if not present in the cache;
determining a relationship of the query to the cache;
assembling complete results data responsive to the query by combining the results data with the missing results data; and
returning to the sender the complete results data.

8. The method of claim 7, wherein the relationship comprises the cache having a duplicate query of the query, wherein the sender is associated with the cached query and the query is removed.

9. The method of claim 8, wherein the sender is associated with one or more cached queries by using a list data structure.

10. A method of claim 7, further comprising:
associating a time to live data with the query operable to determine when the query expires and is to be removed from the cache.

11. The method of claim 7, wherein the relationship comprises the cache having one or more subsets of the query, wherein a single superset query is created from the query and the subsets in the cache.

12. A system for retrieving queries, comprising:
   one or more data stores housing responsive query data;
   a query registration set of executable instructions operable to receive a normalized query and record the query along with meta data for the query and the responsive query data within a managing data store;
   a notification set of executable instructions operable to send a notification to the managing data store if at least a portion of the responsive query data is modified when recorded with the query; and
   a managing set of executable instructions operable to obtain updated responsive query data in response to the notification and to update the recorded queries, the meta data, and the responsive query data within the managing data store.

13. The system of claim 12, wherein the managing set of executable instructions is further operable to associate one or more senders with the query.

14. The system of claim 13, further comprising:
   a sending set of executable instructions operable to update a response to one or more of the senders, if requested by one or more of the senders when the responsive query data has been modified.

15. The system of claim 14, wherein one or more of the senders may request the responsive query data not be updated when modified within the managing data store.

16. The system of claim 12, further comprising:
   a duplication detection set of executable instructions operable to determine if a second query is a duplicate of the query recorded within the managing data store and to maintain only the query within the managing data store.

17. The system of claim 12, further comprising:
   a purging set of executable instructions operable to remove the query from the managing data store.

18. The system of claim 17, wherein the query is removed after a customizable period of time.

19. The system of claim 17, wherein the purging set of executable instructions is further operable to remove the responsive query data from the managing data store.

20. Functional data operable to index queries and query results, the functional data comprising:
   query data and query results data responsive to the query data;
   sender data associated with the query data identifying previous senders of queries;
   period data associated with the query data and operable to determine when the query data is to be removed from a query data store; and
   managing instruction data operable to normalize and record the query data in the query data store and operable to search one or more external data stores for the query results data and record the query results data in the query data store, wherein the managing instruction data is further operable to utilize the sender data to send to the previous senders updates of query results data when at least a portion of the query results data recorded within the query data store has been modified within one or more of the external data stores.

21. The functional data of claim 20, further comprising:
   trigger data operable to notify the managing instruction data when at least a portion of the results data recorded within the query data store has been modified within one or more of the external data stores.

22. The functional data of claim 21, further comprising:
   update instruction data operable to retrieve and record modified results data within the query data store in response to the trigger data.

23. The functional data of claim 22, wherein the update instruction data is configurable by the sender data.

* * * * *

UNITED STATES PATENT AND TRADEMARK OFFICE
CERTIFICATE OF CORRECTION

PATENT NO. : 6,826,557 B1
DATED : November 30, 2004
INVENTOR(S) : Carter et al.

It is certified that error appears in the above-identified patent and that said Letters Patent is hereby corrected as shown below:

Column 11,
Line 53, change "to be" to -- the --.

Signed and Sealed this

Twenty-second Day of March, 2005

JON W. DUDAS
*Director of the United States Patent and Trademark Office*